United States Patent [19]
Vaughan

[11] Patent Number: 5,441,566
[45] Date of Patent: Aug. 15, 1995

[54] EQUIPMENT FOR APPLYING CRUSTING AGENTS TO COAL LOADS

[76] Inventor: Jack M. Vaughan, 107 Rider Dr., Beckley, W. Va. 25801

[21] Appl. No.: 187,977

[22] Filed: Jan. 28, 1994

[51] Int. Cl.⁶ .......................... B05B 3/12; B05B 7/08; B05C 5/00; B05D 7/00
[52] U.S. Cl. .................... 118/300; 118/315; 118/323; 118/303; 239/243; 239/247; 239/263; 239/264; 427/421; 427/212
[58] Field of Search ............... 118/300, 303, 313, 315, 118/323; 239/237, 243, 246, 247, 263, 264; 134/180, 181, 172; 427/421, 212

[56] References Cited

U.S. PATENT DOCUMENTS

| | | |
|---|---|---|
| 2,332,984 | 10/1943 | Brackeen . |
| 2,466,182 | 4/1949 | Peeps . |
| 3,199,786 | 8/1965 | Waldrum ........................ 239/264 |
| 3,351,287 | 11/1967 | Funk et al. ...................... 239/247 |
| 3,391,701 | 7/1968 | Richardson et al. ............ 239/243 |
| 3,536,263 | 10/1970 | Parker . |
| 3,656,694 | 4/1972 | Kirschke . |
| 3,809,317 | 5/1974 | Bender . |
| 3,885,066 | 5/1975 | Schuenninger ................. 118/323 |
| 3,961,752 | 6/1976 | Doeksen ......................... 118/303 |
| 4,068,802 | 1/1978 | Goings . |
| 4,715,538 | 12/1987 | Lingnau . |
| 4,821,961 | 4/1989 | Shook . |
| 5,076,304 | 12/1991 | Mathews ........................ 134/123 |
| 5,273,059 | 12/1993 | Gross et al. .................... 118/315 |
| 5,350,596 | 9/1994 | Walker, Jr. ..................... 427/154 |
| 5,352,297 | 10/1994 | Peters ............................. 134/15 |

FOREIGN PATENT DOCUMENTS 23673 12/1921 France .

OTHER PUBLICATIONS

Product Publication–NLB 1990–2 pages.
Product Publication–Chemdet–3 pages.
Production Publication–Veejet–2 pages.
Product Publication–Kuboda–1 page.

Primary Examiner—Steve Alvo
Assistant Examiner—Steven P. Griffin
Attorney, Agent, or Firm—Spencer D. Conard

[57] ABSTRACT

Methods and mechanisms for encrusting a load of coal to minimize loss of coal dust during transport of a coal load are provided. The mechanisms involve a device, apparatus, and injection unit for applying a rotating stream of aqueous binder composition with sufficient hydraulic force into a load of coal to create a thick protective crust. The binder composition may contain conventional binding agents, but preferably contains wood fibers for formation of the crust. The crust minimizes loss of coal during transport by providing a protective shield against air currents.

5 Claims, 8 Drawing Sheets

EQUIPMENT FOR APPLYING CRUSTING AGENTS TO COAL LOADS

BACKGROUND OF THE INVENTION

Field of the Invention

The present invention relates to methods and equipment for applying crusting agents to particulate materials for transport, and more particularly relates to methods and equipment for treating a load of coal to reduce loss of coal dust during transport thereof.

DESCRIPTION OF THE RELATED ART

Treating a load of coal with a binding agent (crusting agent) to encrust a surface thereof is known. Prior crusting agents have included latexes, petroleum products and pine tar resins, optionally in the presence of surfactants (wetting agents) to facilitate penetration of the surface of the coal load. Such crusting agents were typically applied at low rates and low velocities by stationary spray nozzles which resulted in the formation of a thin crust of coal on the surface having thicknesses of typically less than 2 inches. These prior treatments, however, have suffered from one or more of the following deficiencies: (1) due to the bumping and settling which all transported coal is subjected to, cracks will form in the crust, thin crusts lack the weight required to stay in their protective position during exposure to high winds, and thin crusts tend to break away and are blown off during such transport of the coal load resulting in exposure of the underlying coal body to air movement and the consequential loss of coal dust and coal particles during transport (unprotected coal can lose up to 2% of its weight due to wind loss during transport thereof); (2) prior spray systems have typically generated undesirable levels of air born mist of the crusting composition which can be carried away by air currents during treatment of the coal, drifting to brake wheels, ladder rungs and work areas causing slippage; (3) attempts to prevent cracking of the crust by placing a high efficiency, high elasticity crusting agent on the surface of the coal load, can result in formation of a crust which is too tough and which presents handling problems during delivery and use of the coal from the transport vehicle; (4) prior spray nozzles have utilized small diameter streams which lack the combined mass and velocity (momentum and kinetic energy) to penetrate steeply banked coal profiles of a loaded coal car, resulting in ineffective penetration and enhanced run off of the crusting agent solution down to the walls of the coal car, further resulting in wasted chemicals and inadequate penetration; and (5) inadequate hydraulic penetrating force of prior treatment systems encounters additional problems in the treatment of thermally dried coal, where upon the surface tends to "skin over" upon contact with the crusting agent (in other words, the latex solution upon contact with the warm surface of the coal prematurely forms a solid skin of latex which prevents further penetration and which encourages run off of the crusting agent).

Existing methods utilize stationary spray bars which are inefficient. Uniform application of the crusting agent is not attainable because most loading operations cannot maintain the rail-cars at a constant speed. Irregular speed with a fixed-position spray bar will result in irregular application of the crusting agent. This happens because:

1. The coal flow may be irregular, so the car may have to slow down—even stop, to continually top off during the fill.
2. Mechanical and/or electrical problems may cause start-stop or speed-up, slow down conditions. These problems are not uncommon to both the loadout facility and the train being loaded.
3. For safety reasons, it is undesirable to connect or even touch the rail car with mechanical type sensors to monitor car movement. The human operator typically turns the spray system on and off as the cars are loaded, and cannot effect uniform coverage.

With an increased interest within the coal transport industry to minimize the loss of coal during transport (untreated coal and inadequately treated coal can have losses of up to 2% by weight of the coal during transport thereof), and with a corresponding interest in maximizing profits and minimizing loss of coal dust into the environment, there is a need to provide a treatment system which can reduce coal loss during coal transport. Additionally, there is a need that any treated coal be easily breakable during unloading and subsequent handling thereof.

Accordingly, the present invention provides a method, device, apparatus and injection unit for providing a thick protective uniform crust on coal loads to minimize coal loss during transport thereof.

SUMMARY OF THE INVENTION

The present invention provides a method, apparatus, device and injection unit for treating a load of coal to minimize loss of fine coal (coal particulates up to $\frac{3}{8}''$ can become air-borne) during transport thereof. The method involves a high velocity injection of a thick stream of an aqueous binder composition into an upper surface of a load of coal in a transport vehicle. The velocity, flow rate, diameter and motion of the injection stream is sufficient to cause adequate penetration and spray coverage to form a thick protective crust on the coal load upon evaporation of water from the binder composition sprayed thereon. Optionally the binder agent comprises wood fibers. The device provides a treatment apparatus and means for moving and positioning the apparatus relative to the transport vehicle for treating the load of coal held therein. The apparatus has a plurality of spaced injection units each of which provides a high velocity stream of binder composition and provides a mist control entrapment stream for entraining mist generated by the high velocity stream. The method provides for a thick protective crust having a sufficient mass to resist being blown away by contact with air currents during rail or truck transport, and the apparatus, device, injection unit and method provide for thick crust formation and mist control.

BRIEF DESCRIPTION OF THE DRAWINGS

FIG. 5 is a vertical cross sectional view of a spray block;

FIG. 18 is a perspective view of a high velocity nozzle;

DETAILED DESCRIPTION OF THE INVENTION

Figure 1:
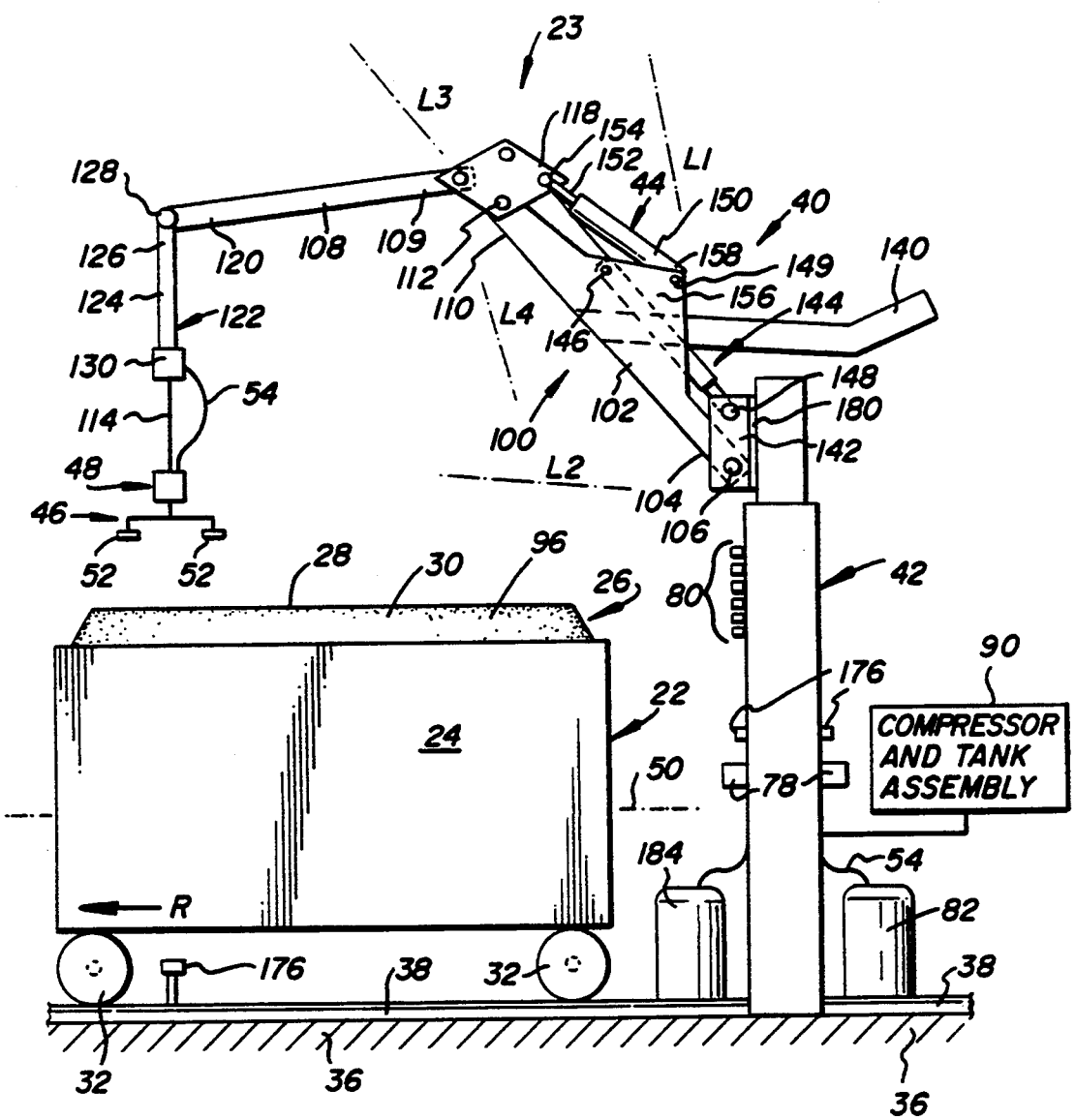
FIG. 1 is a side elevational view of a transport vehicle and a device according to the present invention.
Figure 2:
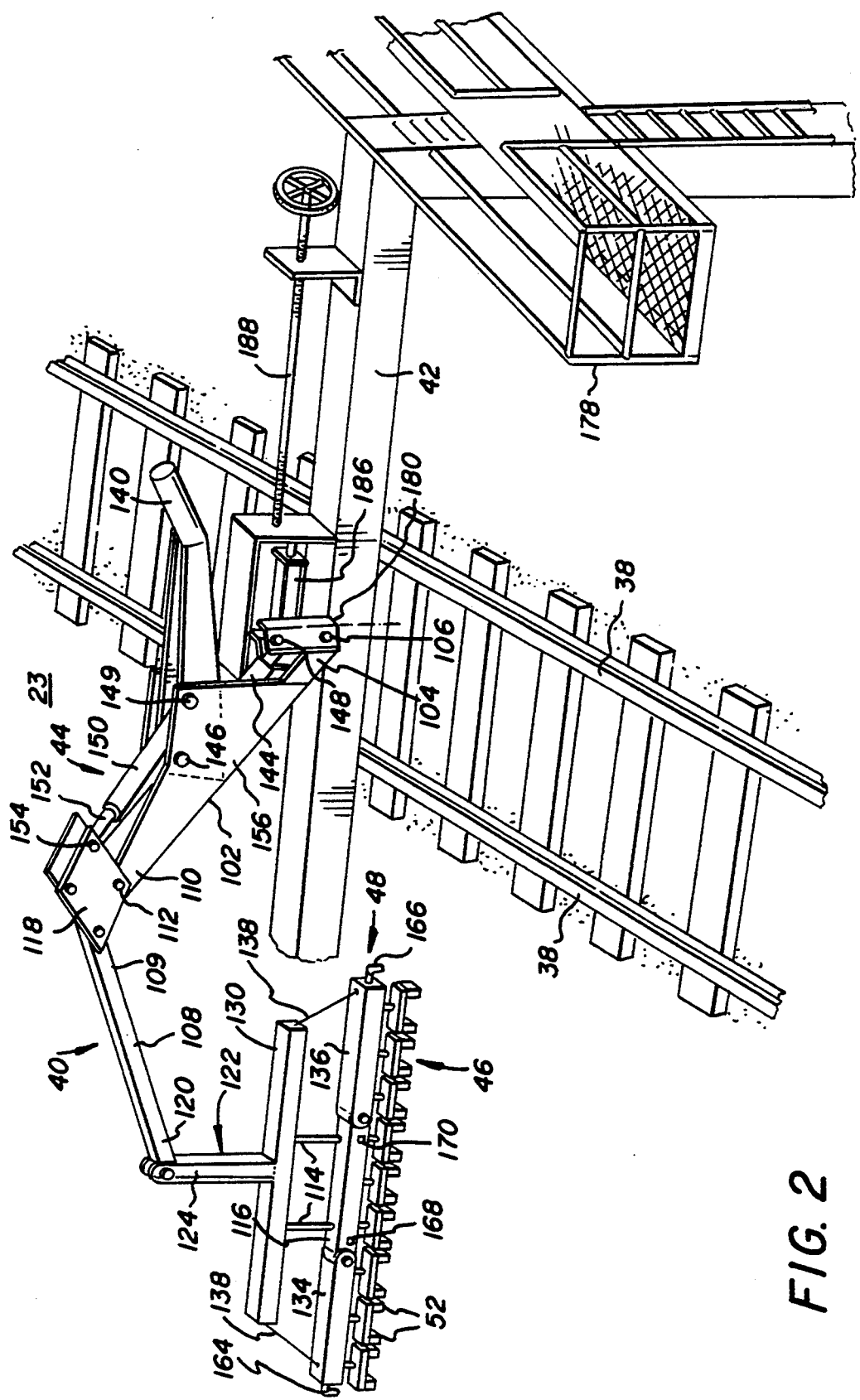
FIG. 2 is a perspective view of the device.
Figure 17:
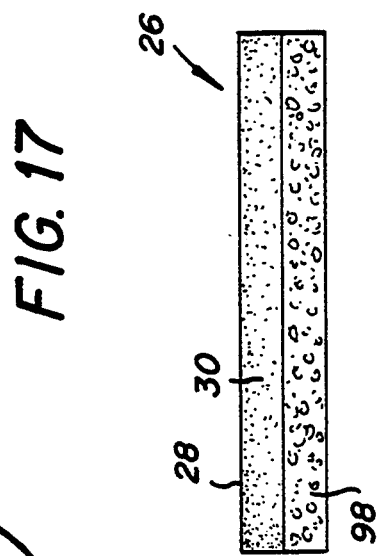
FIG. 17 is a schematic cross sectional view of an upper portion of the treated coal load.
Figure 16:
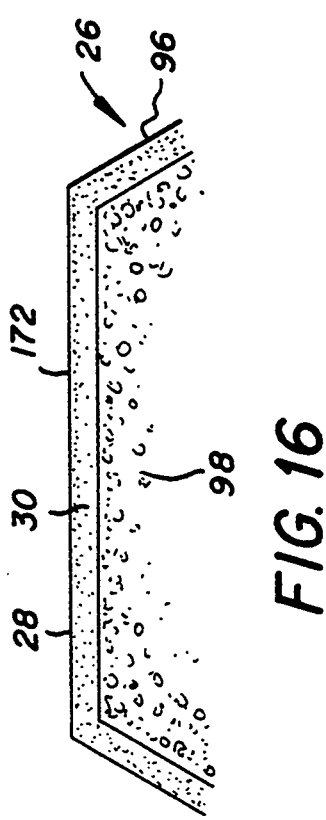
FIG. 16 is schematic or cross sectional view of an upper portion of the treated coal load, the cross section being transverse to the longitudinal axis of the compartment.
Figure 6:
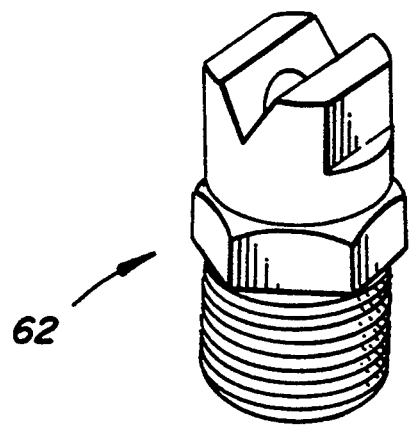
FIG. 6 is a perspective view of a mist control nozzle.
Figure 7:
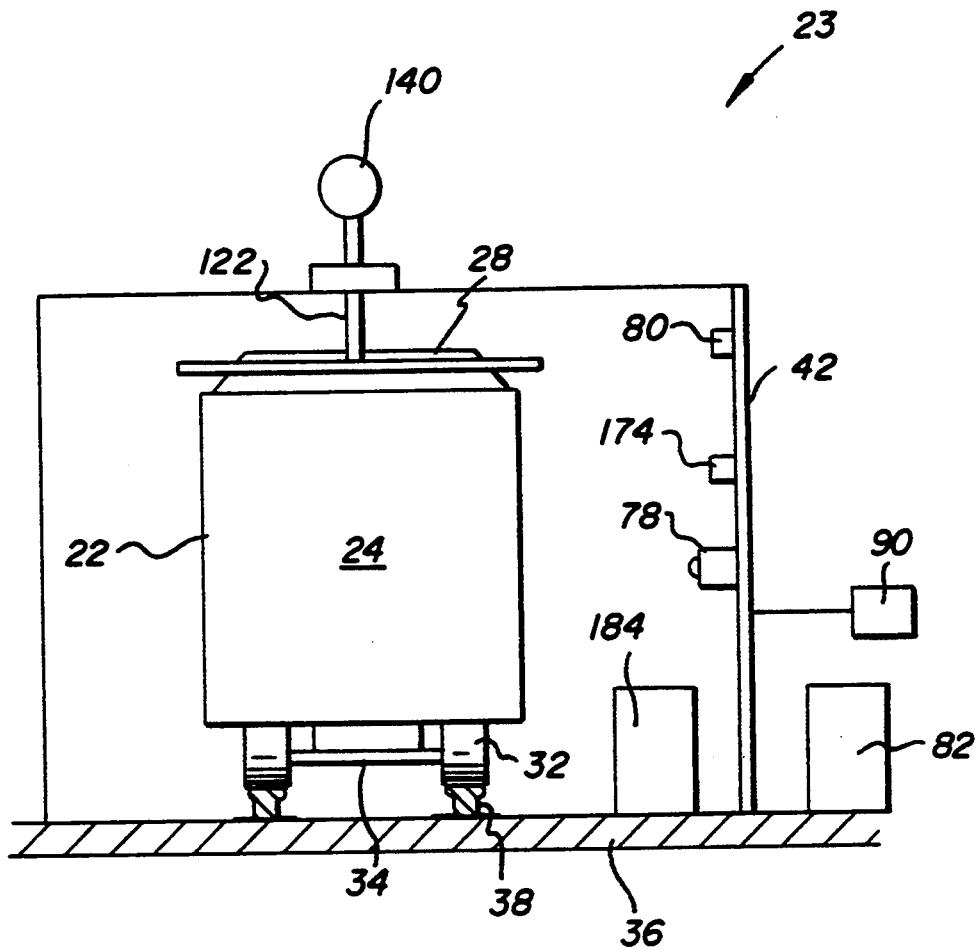
FIG. 7 is a schematic, front elevational view of the apparatus and transport vehicle.

As shown in FIGS. 1, 2, and 7 a device (23) is used to minimize the loss of coal from a transport vehicle (22), such as a rail car or a dump truck, during subsequent transportation of the coal. The transport vehicle (22) has an elongated compartment (24) for containing a load of coal (26). The device (23) treats the load of coal (26) by high velocity injection of an aqueous binder composition into an upper surface (28) of the load of coal (26). The binder composition contains water and a binding agent, and the velocity, flow rate, diameter, and movement of the streams of binder composition from the device (23) into the upper surface (28) of the coal (26) are sufficient to cause a crust (30), as shown in FIGS. 16 and 17, of a thickness of at least 2.0 inches, preferably between 2 and 5 inches, and more preferably between 2 and 4 inches, to form upon evaporation of the water component of the binder compositions. The crust (30) has a sufficient mass (weight) to resist being blown away during rail or truck transport thereof, even upon cracking of the crust due to bumping and settling of the coal load (26) during transport. The transport vehicle (22) has wheels (32) for movement thereof, and the wheels (32) are attached to a supporting axle (34) which carries the compartment (24). The wheels (32) engage the ground (36) or rails (38) depending upon whether the transport vehicle (22) is respectively a truck or a rail car. In either case the transport vehicle (22) is moved by a motor unit (not shown) such as a diesel engine or a gasoline engine.

The device (23) includes an apparatus (40) and a support structure (42) which supports and positions the apparatus (40) above the compartment (24) during treatment. The structure (42) functions as a means for positioning the apparatus (40) above the compartment (24) of the vehicle (22). The apparatus (40) includes a motion mechanism (44) which functions as a means for moving injection units (46) vertically, and longitudinally and optionally laterally above compartment (24).

Figure 3:
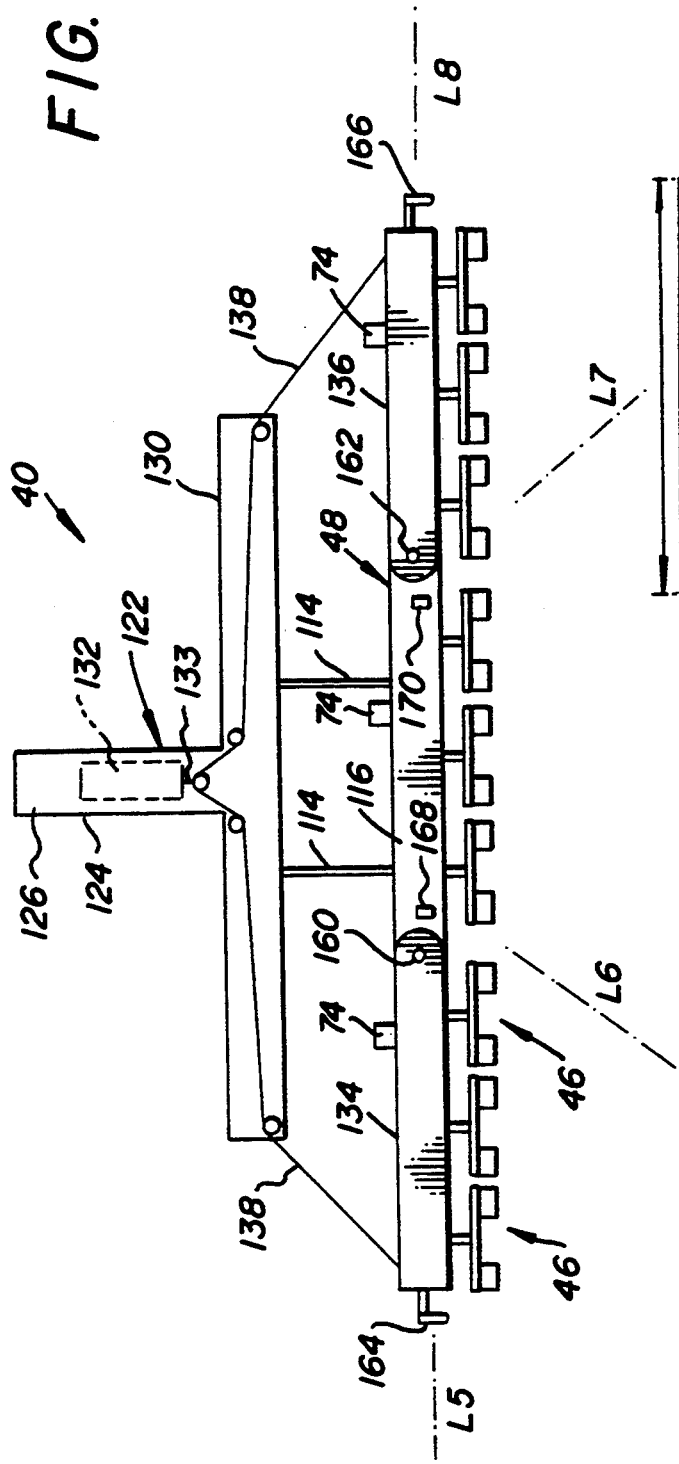
FIG. 3 is a front elevational view of the hanger, showing 2 cables from which is suspended the center section of the spray bar, to the center section are continuations, one bar wing section hinged to the left and one bar wing section hinged to the right, which adjust to the sloped coal contours of a loaded rail car, in this depiction they are horizontally parallel, which might be required when beginning or ending a treatment cycle.
Figure 8:
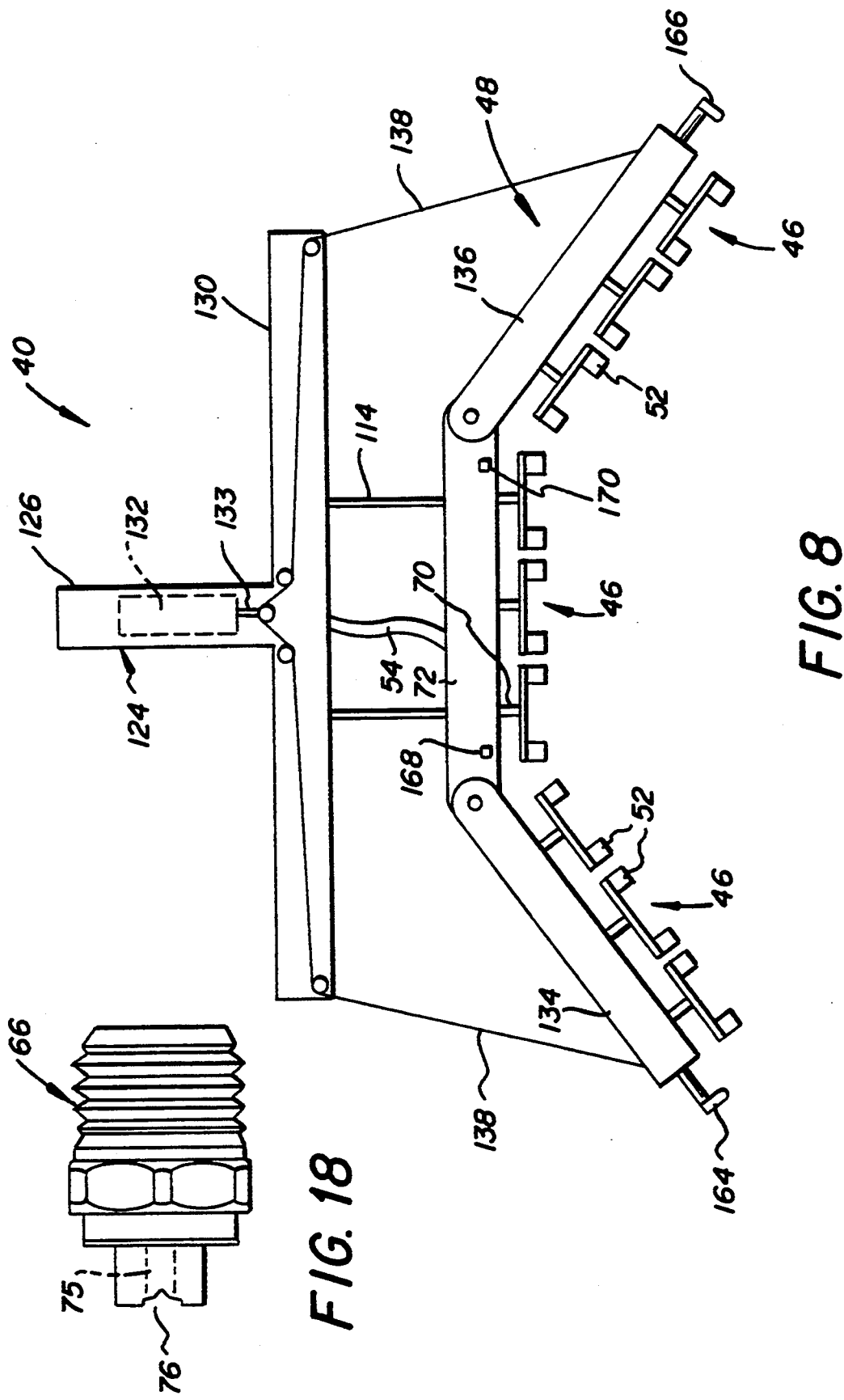
FIG. 8 is a front elevational view of a T-shaped hanger member, showing 2 cables from which is suspended the center section of the spray bar, wherein a center section of a spray bar has additional wing sections, hinged to each side thereof.
Figure 9:
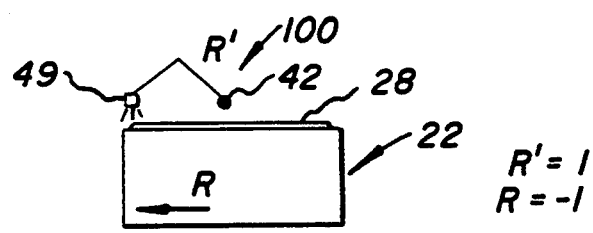
FIG. 9 is a schematic, side elevational view of the apparatus treating the front end of the vehicle.
Figure 10:
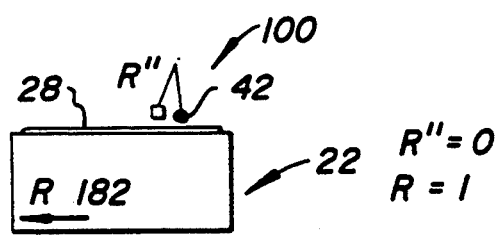
FIG. 10 is a schematic side elevational view of the apparatus after having treated the front half portion of the vehicle.
Figure 11:
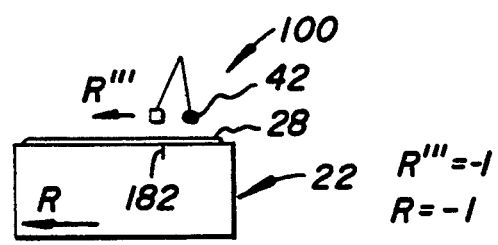
FIG. 11 is a schematic side elevational view of the apparatus as the spray mechanism tracks the last treated portion of the coal load to re-extend the apparatus arms.
Figure 12:
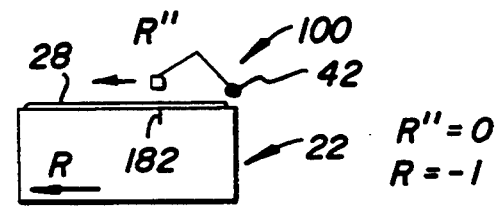
FIG. 12 is a schematic side elevational view of the apparatus re-extended.
Figure 13:
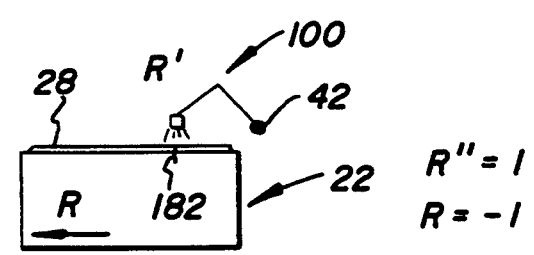
FIG. 13 is a side elevational view of the apparatus beginning treatment of the back half of the vehicle compartment.
Figure 14:
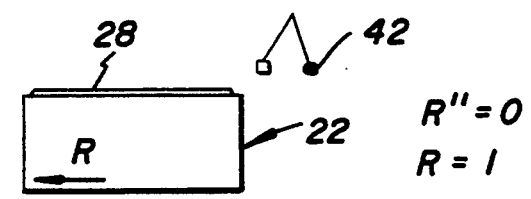
FIG. 14 is a schematic side elevational view of the apparatus after treatment of the back half of the vehicle.
Figure 15:
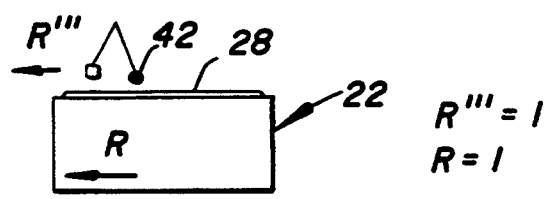
FIG. 15 is schematic side elevational view of the apparatus re-extending by moving the spray mechanism forward with the leading edge of the vehicle compartment.
Figure 19:
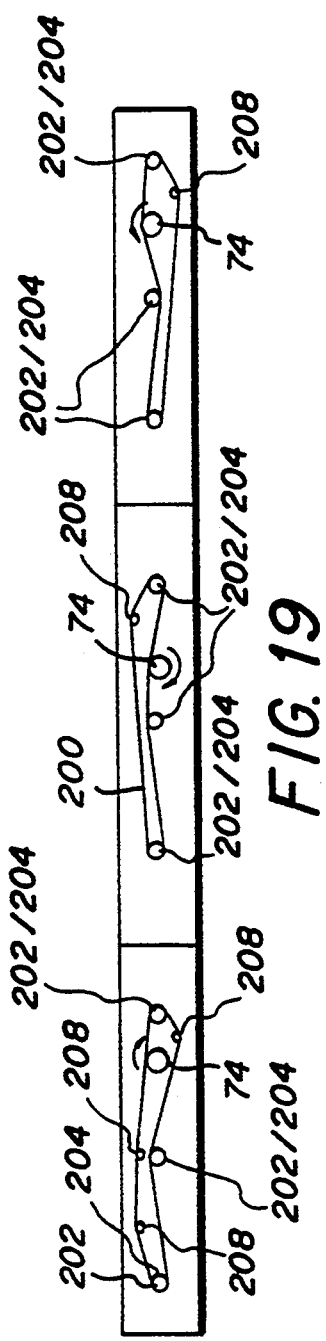
FIG. 19 is a top plan view of a spray bar.
Figure 20:
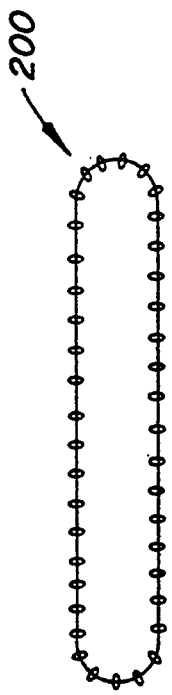
FIG. 20 is a top plan view of a double sided gear belt.
Figure 22:
FIG. 22 is a side elevational view of a gear, shaft and seal.
Figure 21:
FIG. 21 is a top plan view of a gear, seal, shaft.

The apparatus (40) as shown in FIGS. 2, 3 and 8 has a multi-section elongated spray bar (48) and positions a plurality of injection units (46) which are spaced along spray bar (48) transverse to a longitudinal axis (50) of compartment (24). The injection units (46) are spaced relative to one another such that the upper surface (28) of the load (26) of coal will be completely treated during use of the device (23). The spray bar (48) preferably has three sections which each carry a number of injection units (46), which are sealed by rotary seals and are driven by a drive system.

The spray bar (48), as shown in FIG. 8, has artery system (not shown) which is in fluid communication with a flexible, high pressure fluid binder composition supply line (54). The artery system has individual branches (preferably hoses, not shown) which supply liquid binder composition to the individual injection units (46).

Figure 4:
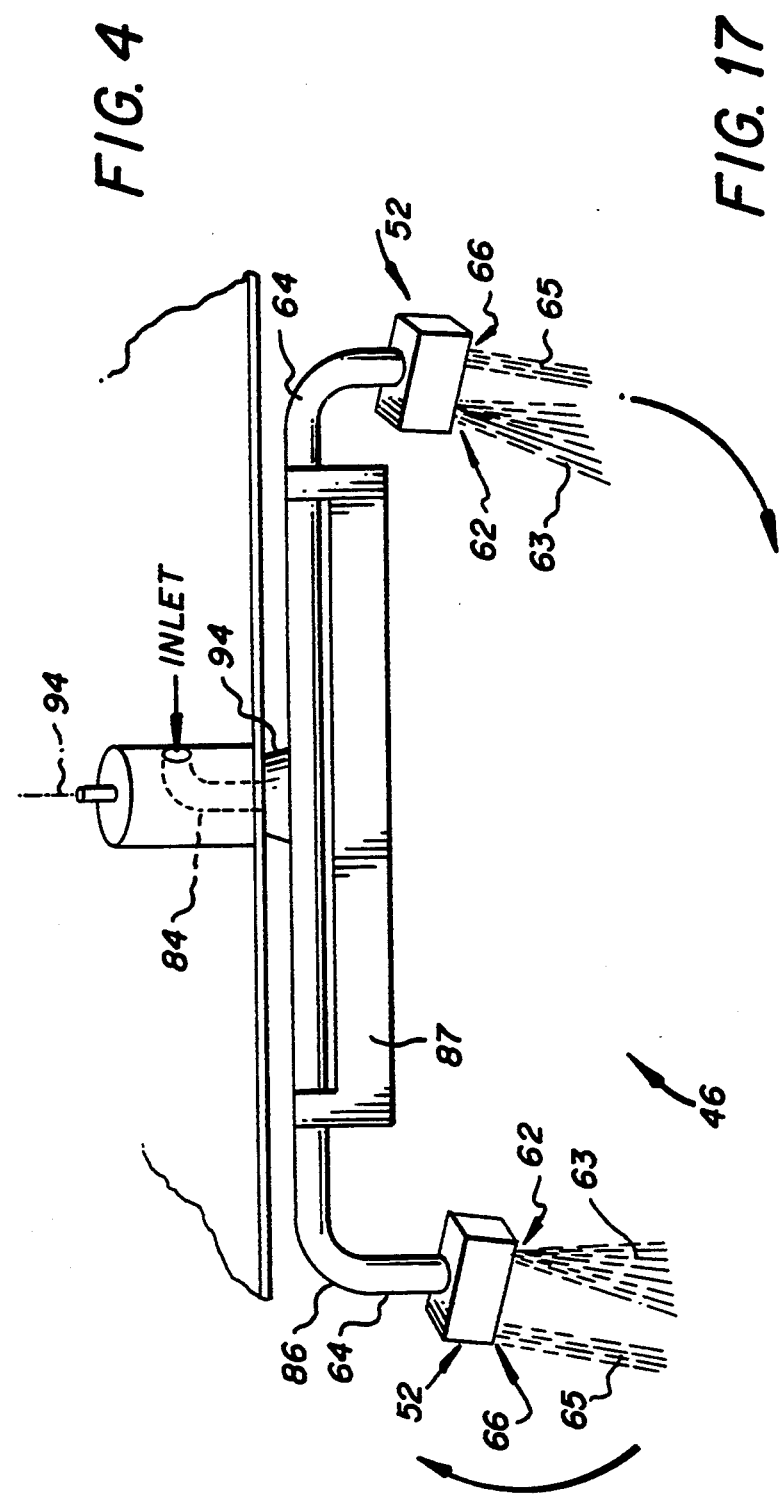
FIG. 4 is a front elevational cutaway view of an injection unit attached to the spray bar.

The rotatable injection unit (46), as shown in FIG. 4, has a pair of diametrically spaced spray blocks (52) (the internal configuration of a block (52) is shown in FIG. 5) each having a mist control nozzle (62) and a high velocity nozzle (66). A pipe (64) carries the nozzles (62) and (66) provide the spacing therebetween and supplies binder composition thereto. In other words, each injection unit (46) has a pair of radially spaced apart spray blocks (52) located at opposite ends of a pipe (64). Each spray block (52) has a high velocity nozzle (66) horizontally (and preferably tangentially spaced apart) from a mist control nozzle (62) so that the mist control nozzle (62) follows immediately behind the high velocity nozzle (66) during rotation of the injection unit for immediate suppression of air borne mist and particles caused the respective high velocity nozzle (66). The mist control nozzle (62) of each block (52) is positioned so that it follows the high velocity nozzle (66) of the respective block (52) during rotation of one injection unit (46) so that mist control is optimized. The mist control nozzle (62) and high velocity nozzles (66) are threadably received by their respective spray block (52).

The mist control nozzle (62) sprays a planar stream (63) downward in an outwardly tapering pattern to provide a triangular shaped spray which serves as a means for entrapping mist generated by high velocity nozzles (66) resulting from impact of the high velocity (cylindrical) binder stream (65) into the load (26) of coal. The planar stream (63) is preferably substantially transverse to the tangential direction of motion of the mist control nozzle (62).

The mist control nozzles (62) also serve to more thoroughly treat and distribute the binder composition across the surface (28), to unite with the deeper treatment forced into the coal load (26) by high velocity solid streams (65) of the high velocity nozzles (66).

The mist control nozzle (62) sprays a portion of the total binder composition supplied to the injection unit (46), (preferably between 20 and 40 percent by volume of the total volume binder composition sprayed), and a major portion of the binder composition (preferably between 80 percent by volume and 60 percent by volume based on the total volume of binder composition sprayed) is directed through the high velocity nozzles (66).

As shown in FIG. 3, injection unit (46) is connected to a rotative motor (74) for rotation thereby. Suitable gear arrangements (not shown) may be utilized to cause adjacent injection units to rotate in opposite (counter clockwise, clockwise) directions so that the units (46) can have overlapping patterns of circular motion. A flat stiffener bar (87) may be attached in a parallel fashion to pipe (64) to stiffen the pipe (64) against excessive vibration during rotation of the unit (46).

As shown in FIG. 18, each high velocity nozzle (66) has an internal bore (75) which terminates in an orifice (76) at the lower end of the nozzle (66). The orifice (76) has a cross sectional diameter of at least ⅛ inch, and preferably ¼ inch to ½ inch, most preferably ¼ inch to ⅜ inch and provides a corresponding jet stream of binder composition having a cross section of at least ⅛ inch, preferably between ¼ inch and ½ inch, and more preferably between ¼ inch and ⅜ inch, at a flow rate of at least 0.7 gallons per minute, and more preferably between 1 and 25 gallons per minute, and has an exit velocity of preferably at least 20 and more preferably between 20 and 80 feet per second, even more preferably between 35 and 60 feet per second, at a pressure of between 5 pounds per square inch (psi) and 500 psi, more preferably between 10 psi and 100 psi and most preferably between 20 psi and 60 psi.

In operation, the transport vehicle (22) in FIG. 1 is driven into position, and may be either stationary or moving during treatment but is preferably moving for efficient treatment of a series of compartments such as a series of rail cars of a moving train. The structure (42) holds the spray bar (48) above the load (26) and compartment (24) preferably such that the high velocity nozzles (66) and the mist control nozzles (62) of injection units (46) are located between 8 and 14 inches above the upper most surface (28) of the coal load (26). During operation, the flow of liquid composition to the nozzles (62), (66), and the movement of apparatus (40) may be manually controlled or may be controlled automatically in response to motion and position sensing elements such as electronic eyes and motion detectors and position sensing devices. Once the vehicle (22) is in position, a pump and tank assembly (82) supply pressurized liquid to the apparatus (40) wherein the liquid flows into each individual injection unit (46) and through an elongated bore (84) and into the radial passages (86) of pipes (64) and out the nozzles (66), (62) to provide the desired high pressure, high velocity jet stream having the desired hydraulic force and to provide the desired mist control streams.

Also during operation, the motor (74) forces rotation of the injection units (46) by electrical, compressed air or hydraulic forces. For compressed air power, high pressure air is supplied from compressor and tank assembly (90) to the air motors (74) forcing rotation of a gear wheel (not shown) and correspondingly forcing rotation of the injection unit (46) thereby providing the nozzles (66), (62) with a circular motion about a central axis (94) and correspondingly providing the high pressure streams of liquid binder composition with a circular pattern for impingement upon the upper surface (28) of coal load (26) and thereby providing thorough coverage of the upper surface (28). Mist Control nozzles (62) serve double-duty by controlling mist and providing a wider impact pattern to provide more thorough coverage of the upper surface (28).

The high-velocity solid stream (round) jets (65) provided by the high velocity nozzles (66), while they must penetrate the upper surface (28) first, are intended to provide a sub-surface matrix of crust. Similarly, the rotation of the unit (46) provides the mist control nozzles (62) with a circular motion about central axis (94) and correspondingly providing the mist control streams with a circular pattern for entrapping mist and loose coal particles generated by the high velocity streams. The high flow rate, large diameter and high velocity of the stream of binder composition exiting the high velocity nozzles (66) into the upper surface (28) of the coal load (26), permits the desired depth of penetration into the coal load (26) even at sloped surfaces (96) thereof. As shown in FIG. 16, the coal load (26) typically has an upper surfaces (28) which has substantially sloped surface (96). The hydraulic forces and spray pattern of the injection units (46) of the present invention provide the required level of coverage and penetration to permit formation of the desired crust (30) thickness to protect an underlying body (98) of coal load (26) (see FIGS. 16 and 17).

The binder composition preferably contains from 1 to 30 percent by weight of a binding agent based on the total weight of the liquid composition, and preferably contains from 70 to 99 percent by weight of water based on the total weight of the binder composition. The binding agent could be any suitable conventional binding material, for-example a rubber latex such as a butadiene latex material. The key to the binder composition is that it provides a crust (30) which is crackable and breakable, but which retains its shape during transport. The high hydraulic forces of the present treatment system permits the creation of a thick crust, which is substantially thicker than conventional crust, and which provides protection to the body of coal even upon cracking of the crust. Furthermore, although the crust (30) is thick, it is easily handled and broken upon final delivery to the user of the coal.

The binder composition more preferably comprises binding agent preferably present at a level of between 2 and 20 percent by weight based on the total weight of the composition, and most preferably present at a level of between 3 and 10 percent by weight thereof; the binder composition also more preferably comprise water present at a level of between 80 and 98 percent by weight based on the total weight of the composition, and most preferably between 90 and 97 percent by weight thereof. Suitably binding agents are commercially available, and include DustBan TM sold by Nalco Chem. Co., Hercobind TM sold by Hercules Inc. and Coherex TM sold by Witco Chem. Co.

In addition to the above conventional binding agents, wood fibers may be used to form the protective crust. The wood fibers may be a waste product of paper manufacturing processes. Preferably the wood fibers are sufficiently fine to be sprayably by the injection units of the present invention. The wood fibers would not be sprayably in conventional spray systems having small spraying orifices (for example less than ⅛ inch diameter, for example 1/16 inch diameter), due to the tendency of the fibers to plug such small orifices. The use of wood pulp has numerous potential advantages including (1) use of a waste by product of the paper making process (possibly reducing land fill waste), (2) fuel value of the binder, (3) low environmental impact, (4) minimal misting (minimal drift of air borne material) and (5) production of a crust which is breakable and handleable upon delivery to the coal load. A separate water supply which is free of solids may be utilized for the mist control nozzles (62) and their corresponding mist control streams.

The hydraulic force of the injection stream (65) is sufficient to permit the desired depth of penetration of the binder composition, and the rotative motion of the nozzles of the injection unit provides complete and adequate coverage and dispersal of the binder composition. The small diameter (preferably having a diametric spacing of from 6 inches to 24 inches, more preferably from 15 inches to 20 inches) circular motion of the high velocity nozzles (66) of the injection unit (46) permits penetration without run off of the binder composition. Less expensive binding agents (and optionally less effective binding agents) may be employed with or free of surfactants (wetting agents) to generate the thick crackable crust which is sufficiently thick for travel, but which will easily break during unloading and subsequent handling to facilitate easy utilization of the coal load (26) upon delivery.

In operation, one key feature of the present invention is the ability of the system to provide a uniform application of the crusting agent to the coal load (26) regardless of the speed of the transport vehicle (22). This uniform rate of delivery of the binder composition is achieved by control of the fore-and-aft movement of the spray bar (48) of apparatus (40) in the direction of travel of the vehicle (22) along the longitudinal axis (50) of the compartment (24) of the vehicle (22) in response to the speed of the vehicle (22). A stationary radar speed detector (78) (or multiple detectors) is positioned adjacent the path of the transport vehicle (22). The speed detector (78) may be a conventional unit. The detector (78) senses the actual speed of the vehicle (22), including stop and start conditions. The speed of the vehicle (22) is then transmitted to a computer (not shown), or other correlation device, to then control fore-and-aft movement of the spray bar (48) of the apparatus (40) to provide the spray bar (48) and injection units (46) with controlled speed relative to the movement of the vehicle (22). By maintaining a constant controlled relative speed during spraying, the rate of binder applied by the nozzles (62), (66) can be maintained constant, and a uniform application rate can be achieved.

The apparatus (40) includes an articulated knuckle boom (100) for positioning and moving the spray bar (48) and injection units (46) relative to the upper surface (28) of the coal load (26) of the transport vehicle (22). A first arm (102) of the boom (100) is pivotally mounted with one end (104) adjacent the support structure (42) for power actuated pivoting therefrom about a first horizontal axis (106) which is transverse to the path of the transport vehicle (22). The boom (100) further includes a second arm (108) which is carried pivotally at its first end (109) by the distal end (110) of the first arm (102) for power activated pivoting thereon about a horizontal second axis (112) parallel with the first axis (106). The second arm (108) is pivotally attached at its end (109) to the distal end (110) of first arm (102) through pivot (112) preferably by a knuckle plate (118) which is fixedly attached to the end (109) of second arm (108), and which is rotably attached to the first arm (102) by pivot (112). A distal end (120) of second arm (108) carries an inverted T shaped hanger member (122) which has an upper vertical segment (124) pivotally attached at its upper most end (126) at pivot (128) to the distal end (120) of second arm (108). The member (122) has a horizontal segment (130) which is fixedly attached at its center to the vertical segment (124). The end (120) of arm (108) is attached by pivot (128) to an inverted T member (122). The vertical segment (124) of this contains a hydraulic cylinder (132) which articulates the outer wing sections (134), (136) of the spray bar (48). The cylinder (132) manipulates the outer wings (134), (136) via a cable (138) extending down the hollow square tubing of vertical segment (124), through the hollow (also square tubing) horizontal segment (130), connecting to each outer wing (134), (136). Two support cables (114) are provided for supporting a center horizontal section (116) of the spray bar (48) from the inverted T shaped member (122) thereby allowing the spray bar (48) to have some movability in the event that it is impacted by the vehicle (22) or its load (26). The boom (100) has a counter weight (140) extending backward from the first arm (102) for pivoting the boom (100) about the pivot (106) so that in the event of a power failure the spray bar (48) swings up and away from the vehicle (22) and the coal load (26). The counter weight (140) is on the opposite side of the pivot (106) from the spray bar (48). An electric motor/hydraulic pump combination (184) will supply pressurized hydraulic fluid through hydraulic fluid lines as needed to independently operate any hydraulic cylinders of the device (20). Unless otherwise indicated, all cylinders and motors are hydraulically operated and all cylinders contain a double acting piston for power activation of the corresponding connecting rod. Flexible hydraulic lines are provided for fluid communication between cylinders and hydraulic motors on the one hand and their corresponding lines having been generally omitted from the drawings for clarity. The boom (100) is mounted onto the structure (42) through a carriage (142). The first arm's inclination in a vertical plane is controlled between two limited positions L1 and L2 (FIG. 1) by means of a mounted cylinder (144) pivotally connected at pivot (146) to a first arm (102) via a rod (not shown) and is pivotally connected by pivot (148) to carriage (142). The first arm (102) carries at its distal end (110) through pivot pin (112), the second arm (108) which is adjustable relative to the first arm (102) through an angle between two positions L3 and L4 (FIG. 1) by means of a pivotally mounted hydraulic cylinder (150) having a rod (152) pivotally connected to a pivot (154) to knuckle plate (118) which is fixedly attached to the second arm (108). An extension plate (156) extends upwardly from and is fixedly attached to the first arm (102). An end (158) of cylinder (150) is pivotally attached to extension plate (156) at pivot (149). Pivot (146) may be positioned in the forward end of extension plate (156).

By independent control of the two cylinders (144), (150), the position of the spray bar (48) and units (46) relative to the coal load (26) can be controlled. The fore-and-aft movement of the spray bar (48) and its depending units (46) is controlled to maintain a constant relative speed relative to the vehicle (22) during spraying.

The apparatus (40) includes a multi-section spray bar (48), which has the central horizontal section (116), and two outer wing sections (134), (136) which are pivotally attached to the center section (116) via pivots (160), (162) at opposite ends thereof. The pivot angle (see L5, L6, L7, L8 at FIG. 3) of the outer sections (134), (136) is controlled by a cable (138) which is extended and withdrawn by a cylinder (132). By withdrawing the cable (138), the cylinder (132) can effectively lift the outer wing sections (134), (136) to a horizontal position as shown in FIG. 3, and then by allowing the rod (133) and cable (138) to be extended, thereby allows the wing sections (134), (136) to pivot downward toward the coal load (26) and in conformance with and parallel to the slopes (96) of the sides thereof as shown in FIG. 8. This pivoting of the wing sections (134), (136) permits a direct and uniform injection of liquid straight into the sloped sides (96) of the coal load (26). Sensors (164), (166), (168), (170) at the outer ends of the wing sections (134), (136), and the outer ends of the central section (116) respectively, provide distance indications to a computer (not shown) or other correlation device, for operation of the cylinder (132) for control of the location of the wing sections (134), (136). The sensors are conventional in nature, and are utilized to determine the distance of the spray bar (48), and its corresponding sections (116), (134), (136) and corresponding nozzles, relative to the coal load (26) for control of the spray bar (48) and its corresponding sections (116), (134), (136) relative to the top (172) and sides (92) of the upper surface (28) of the coal load (26).

The bulk of transported coal is by rail. Coal is loaded into open-top hopper cars. Coal loadout from the larger mining facilities is flood-loaded. Flood-loading utilizes high-speed belt conveyor systems which move the coal from a stockpile to a surge-bin. The surge bin is located generally over the railroad, and the empty coal train pulls the hopper cars beneath. Loading is accomplished by lowering a retractable chute down into the car (22), and a hydraulically operated gate releases coal from the bin into the car (22). The load-out operator has full view of the process, and has radio contact with the train engineer in the train engine. Sometimes the engine is "captive", meaning it is owned and operated by the coal company. Captive engines are usually operated by remote control, and the loadout operator will control the speed of the cars being loaded. To maintain a smooth non-stop loading operation, a second chute is usually employed. This permits the operator to begin loading the succeeding car while finishing loading the front car. The speed of the car movement during the train loading operation will vary at different mines. Some operations will load a railcar in less than a minute. Others might require 30 minutes or more, for small operations.

While the fast-loading facilities maintain a more regular car speed, none will travel the same speed from beginning to end. Various factors influence this rate of travel:

1. As the train of cars are filled, the engine must apply more horsepower to compensate for the increased load. This is done by increasing the engine's RPM's, and there is a lag time for this to take place, which results in a slow-down, speed-up situation at the fast loading mines, and stop-start condition at smaller load-out facilities.

2. It is not uncommon for the loading procedure to completely stop due to other mechanical or electrical interruptions.

The application of a crusting agent, which takes place when the cars (22) are loaded, should adjust itself automatically to variations of car speed because:

1. It is desired that optimum and uniform application of crusting agent is essential for economic and technical reasons, because too much agent will be wasteful, and too little agent will not create sufficient crust thickness to protect against wind-loss of coal.
2. It therefore follows that:
   A. A non-moving, stationary crusting agent (binder) spray bar would be undesirable to apply uniform coverage, and rate of flow (i.e. pressure) cannot be changed because such change would adversely affect penetration, so
   B. The applicator mechanism must travel parallel to, and compensate for, the speed changes and/or complete stop and restart conditions frequently encountered in the loading process.

The present system would work in the following manner:

1. The entire spray pattern in preferred form would encompass the full width of the railcar, and would cover approximately 20 linear inches fore-and-aft if the car (22) and spray bar (48) were stationary.
2. The spray bar (48) has vertical, as well as fore-and-aft movement (for example, up to 7 feet at a time) facilitated by the knuckle-boom (100).
3. The vertical movement of the knuckle boom (100) is dictated by non-contact stationary sensors (80) (and/or non-contact movable sensors (168), (170)) which transmit individual rail car height to a computer, which then transmit data to a suitable receiver, which in turn activates the hydraulic cylinders to make the vertical adjustment to that car after other stationary sensors (174), (176) have determined the location of the head-end of the car (22), so that the vertical movement of the spray bar (48) (spray bar refers to the three sections that are suspended from the hanger, and comprise all injection units and mounting structure) coincides with clearance requirements to begin a spray cycle.
4. The speed of the fore-and-aft movement is controlled hydraulically by reacting to a stationary radar detector (78) which senses actual speed of the car (22) during loading, including stop/start conditions. This information is transmitted to the computer (not shown), which tells an hydraulic fluid system actuator (184) which operates the cylinders (144), (150) by controlling hydraulic fluid thereto, how fast to move the end of the knuckle boom (100), from which suspends the spray bar (48)/injection units (46). The spraying is activated when the spray bar (48) is moving in the opposite direction to car (22) travel. To visualize this, it must be seen that the binder will be applied in a series of sequences and each sequence is controlled by (1) limits of the knuckle boom (100) travel in horizontal fore-and-aft travel, and (2) speed of loaded car (22) under the spray bar (48).

If spray bar's horizontal travel is 6 feet, and a spray sequence is started at its outstretched limit, the BGA (Binder Gallons to Apply) is time calculated, based on CS (car speed, uncontrollable) and BHTT (boom horizontal travel time, controllable).

If the ROA (Rate-of-Application) is 0.6 gallons per lineal foot, and a sequence is 6 ft, then 3.6 is the BGA. The single controllable, BHTT, is calculated by maximizing gallons per minute spray bar (spray bar (48) refers to combination of the center and two wing sections) output sufficient to more than satisfy any possible demand under conditions normal to that facility. The computer would instantly adjust BHTT to apply the correct gallons per foot of travel, in this case 0.6 gallons. The application time is intended to be shorter than the car travel time for each sequence. (Total actual spraying time will be 30 seconds or less, per car).

A sequence is ended, and binder stopped simultaneously, when the boom horizontal movement reaches its rearward limit. But as the car (22) continues forward, the boom (100) will move to match the car speed, and hold its' place at the same vertical distance until it again attains maximum "reach". Then the sequence is repeated. Other sensors will cut short the last sequence when the end of the car is reached. The cycle is repeated on subsequent cars.

Safety measures include a counterweight (140) or spring-loaded actuators (not shown) that would instantly move the boom/spray bar assembly up and out of the way in the event of power failure.

Another feature the knuckle boom (100) offers relates to maintenance of spray bar (48) and its component, as well as the hydraulic cylinder (132) and cable (138) which articulate the spray bar to conform to loaded coal profiles: The boom (100) will swing 90° via carriage (142) to either side to position the spray bar to the outside of rail cars (22) allowing maintenance or adjustments while coal loading continues or during idle load-out periods. A service platform (178) can be constructed off the ground, attached to one of the support legs. Carriage 142 contains a vertical pivot axis (and vertical pivot) (180) which allows for horizontal swinging of the boom (100).

The sequence for application of the binder composition to the coal load (26) of the moving vehicle (22) is shown in FIGS. 9–15. FIG. 9 indicates initiation of the treatment at the front end of the compartment (24) with the boom (100) extended forwardly. As the vehicle moves forward at a rate of R' (for example 1 ft/sec), the spray bar (48) applies binder composition to the coal load (26) and moves rearwardly at a rate of R' (for example 1 ft/sec rearward) (the + and − signs for the speeds are used to indicate direction and the values are used only for purposes of illustration). As shown in FIG. 10, after the spray bar (48) has moved to its rearward position (for example, adjacent the support structure (42) and correspondingly adjacent the carriage (142)), the spray bar's motion is momentarily stopped (R''=0) (a fraction of a second) the spraying of binder is temporarily stopped, and as shown in FIG. 11, the motion of the spray bar is reversed to reextend the boom (100) and to maintain the position of the spray bar (48) over the last treated portion of the coal load as indicated by the mark (182), until the boom is reextended as shown in FIG. 12 whereupon the motion of the spray bar is again momentarily stopped (a fraction of a second), and the spraying of binder composition is reinitiated as shown in FIG. 13 whereupon the spray bar (48) is moved backward (R''=1) to treat the remaining surface of the coal load. As shown in FIG. 14, spraying temporarily stops when the end of the vehicle is encountered, and reextension may occur by following the end of the vehicle treated in FIG. 14 or by reextending upon encounter with a new vehicle as shown in FIG. 15. During motion of the spray bar through FIG. 9–15, the height of the spray bar (48) and the angle of the wing sections (134), (136) is controlled to maintain the desired spacing from and conformance with the surface of the coal load. FIGS. 9–14 illustrate one embodiment wherein the treatment is done in two stages (the front half of the rail car, then the back half of the rail car). In practice, though, the knuckleboom (100) (and spray bar (48)) will do as many fore-and-aft sequences as is necessary to cover and treat the length of the various size railroad cars (or other containers).

Fore-and-aft movement, and vertical movement, of the spray bar (48) is controlled by the motion mechanism (44) which includes cylinders (144), (158), which are powered by hydraulic fluid from an electric motor/-pump/accelerator assembly (184) working in response to sensors and detectors (174), (176), (78), (80). Vertical motion of the spray bar (48) is also controlled by cylinders (144), (158) in response to distance detectors (168), (170). Angular orientation of outer wings (134), (136) is controlled by cylinder (132) and its action upon cable (138) in response to distance detectors (164), (166). The upper surface (28) of the coal is illustrated as having a top surface (172) which is generally horizontal and sloped surfaces (96) which slope downwardly and outwardly from the top surface (172). The carriage (142) is attached to the hydraulic cylinder (186) for rotative motion about a vertical axis. Optionally, the rotative force about the vertical axis may be provided by a hand crank arrangement (188).

Preferably each injection unit rotates at a rate of between 100 rotations per minute (rpm) and 350 rotations per minute, more preferably between 250 and 350 rpm, and most preferably between 275 and 300 rpm.

The injection units are preferably driven by the hydraulic motor (74) through a double sided gear belt (200) as shown in FIG. 20, which is arranged to drive the individual injection units (46) through their respective gear shafts (202) which have fixedly attached thereto gear (204) as shown in FIGS. 21 and 22. The injection units can rotate without loss of fluids via seals (206) which are spaced between the gear (204) and the upper surface of the respective sections (116), (134), and (136). Freely rotating tensioning pins (208) (which may be toothed) may be used to maintain the belt (200) in direct contact with the respective gear (204).

I claim:

1. An injection unit for injecting a binder composition into a load of coal and for controlling mist generated by said injecting, said unit comprising:

(a) a pair of diametrically spaced apart spray blocks carried by a pipe and located at opposite ends of the pipe, said pair of spaced apart spray blocks being rotatable in a circular motion about a central vertical axis, said pair of blocks being diametrically spaced apart about said central axis, wherein each of Said spray blocks comprises
  (i) a high velocity nozzle for providing a vertical, high velocity cylindrical stream of said binder composition, said stream having a diameter of between $\frac{1}{4}$ inch and $\frac{1}{2}$ inch;
  (ii) a mist control nozzle for providing a downwardly outwardly tapering planar spray.

2. A device for injecting a binder composition into a load of coal carried in an elongated compartment of a transport vehicle, said device comprising:

(a) an apparatus comprising a horizontal spray bar comprising:
  (1) a plurality of horizontally spaced injection units, at least one of said injection units comprising a pair of diametrically spaced apart spray blocks carried by a pipe and located at opposite ends of the pipe, said pair of spaced apart spray blocks being rotatable in a circular motion about a central vertical axis, said pair of blocks being diametrically Spaced apart about said central axis, wherein each of said spray blocks comprises (A) a high velocity nozzle for providing a substantially vertical, high velocity cylindrical stream of said binder composition, and (B) a mist control nozzle for providing a planar vertical spray,
(b) means for positioning said apparatus above said compartment,
(c) means for moving said apparatus along a longitudinal axis of said elongated compartment.

3. The device of claim 2 wherein said plurality of units are spaced substantially along an axis transverse to said longitudinal axis.

4. The device of claim 2 wherein said planar vertical spray is in the form of a downwardly triangular tapering spray.

5. The device of claim 2 wherein said spray bar comprises a horizontal center section and two wing sections which are pivotally attached to the center section and which are movable into inclined orientations.

* * * * *